Patented Mar. 10, 1931

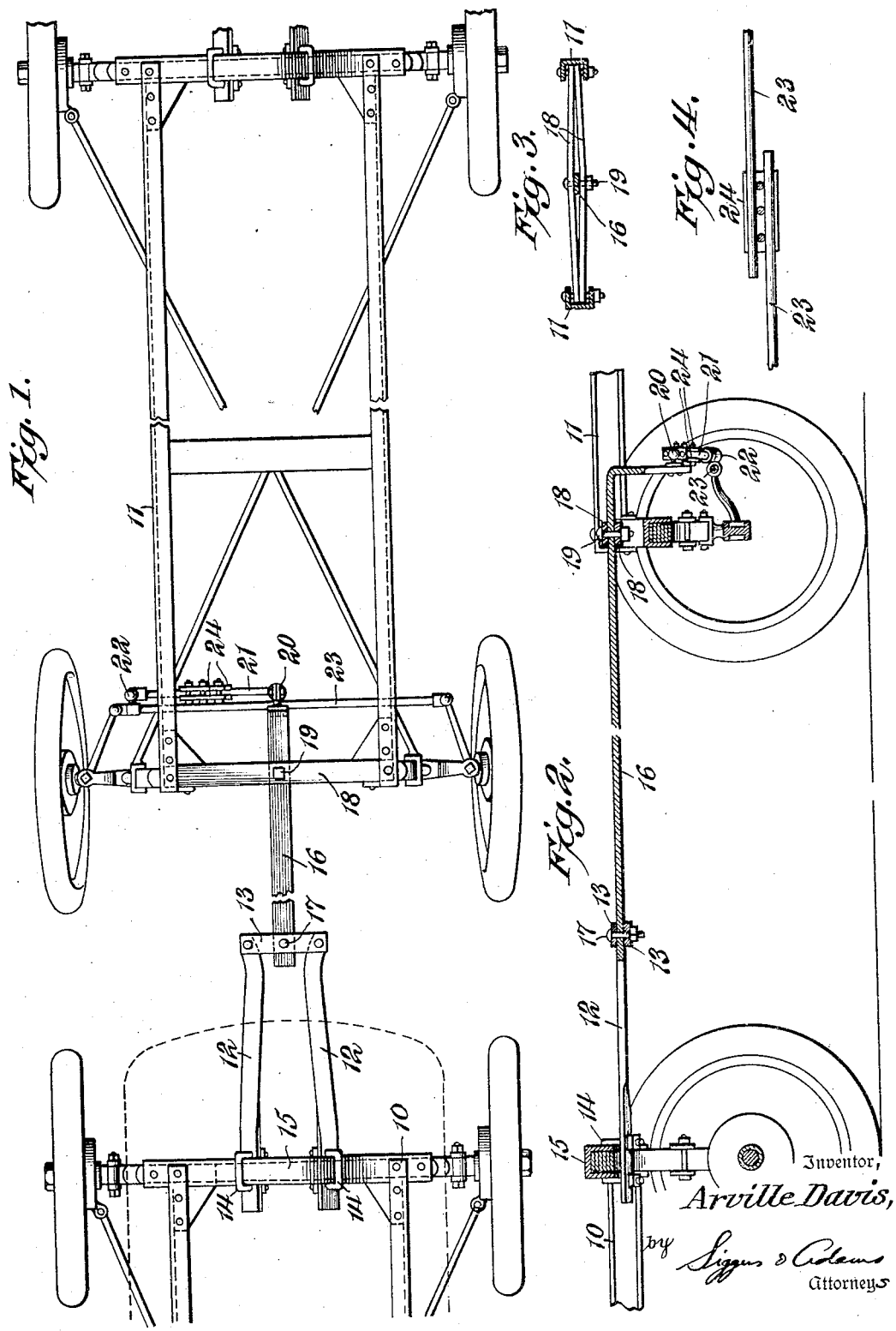

1,796,085

UNITED STATES PATENT OFFICE

ARVILLE RAY DAVIS, OF GAINESVILLE, TEXAS

TRAILER HITCH

Application filed September 7, 1928. Serial No. 304,548.

This invention relates to trailer hitches adapted to hitch a trailing vehicle to an automobile or motor vehicle and aims to provide relatively simple and inexpensive pulling mechanism which can easily be applied to such vehicles and which are both sturdy and durable. Also, it aims to provide improved means to steer a trailing vehicle or a plurality of such vehicles so that they will follow in the path of the motor vehicle.

In the accompanying drawings,

Fig. 1 is a fragmentary top plan view showing the preferred form of the pulling mechanism applied to a motor vehicle and a single trailer;

Fig. 2 is a fragmentary sectional view taken on the line 2—2 of Fig. 1;

Fig. 3 is a sectional view taken on the line 3—3 of Fig. 1;

Fig. 4 is a fragmentary sectional view on the line 4—4 of Fig. 1.

Referring particularly to the drawings, the improved hitch is there shown as being applied to the rear end of a motor vehicle 10 and a single four-wheeled trailer 11 which may be of a conventional design. The arrangement is such that the mechanism will function on rough roads and will guide the trailer by its steering mechanism to follow the motor vehicle around curves.

Herein, a coupler, comprising a pair of spaced arms 12 having upper and lower cross plates or bars 13 bolted across their rear ends is secured to the rear end of the chassis frame of the motor vehicle by means of the U-bolts 14 which are used to secure the rear spring to the saddle 15 or cross member of the chassis frame. The arms project rearwardly beyond the body so that a draw bar or tongue 16 can easily be pivotally connected to them between the two cross bars or plates 13.

The draw bar or tongue is shown as being bent substantially L-shaped having its forward end pivotally mounted between the plates by a suitable pin or bolt 17 passing through registering holes. The tongue, adjacent to the rear end, is also pivotally mounted with respect to the chassis frame of the trailer. Herein, a pair of flat bars 18 are secured between the front ends of the side frame members and the tongue is pivoted between these bars by a pivot bolt 19 (Fig. 3). The cross bars 18 have sufficient play to permit the tongue to swing up or down as the motor vehicle runs over ruts or bumps.

The other arm of the tongue projects downwardly at the rear end and is connected by a ball and socket joint 20 to a steering bar 21 which, in turn, is connected by another ball and socket joint to the usual steering rod 23 on the trailer.

Herein, the steering bar 21 is made in two pieces adjustably connected or clamped together between clamping plates 24. This arrangement permits easy adjustment of the steering mechanism so that the front wheels of the trailer can be properly alined with the rear wheels of the towing vehicle for a straight pull.

From the foregoing description, it will be understood that the trailer hitch mechanism comprises only a relatively few simple parts which can be made very easily of ordinary steel stock. Moreover, the coupling arms for the towing or motor vehicle can be permanently attached to the rear end of the vehicle without interfering with its ordinary uses. Further, one or more trailers can be coupled to a towing vehicle in much the same fashion as a series of cars, it being only necessary to guide the front end of a tongue into the space between the cross bars 13 on the coupling arms and insert a coupling pin or bolt 17. Furthermore, the construction and arrangement is such as to permit the draw bar or tongue to have sufficient vertical rocking motion to take care of any differences in level between the towing vehicle and the trailer as when they are traveling over rough roads. The strength of the hitch is such as to enable it to tow a maximum load and the load or tension is transmitted directly to the chassis frame of the towing vehicle.

Obviously, the present invention is not restricted to the particular embodiment thereof herein shown and described.

What I claim is:—

1. In combination with a towing vehicle and a trailer, coupling means permanently secured to the rear end of the chassis frame of the towing vehicle and projecting rearwardly of the body thereof; a substantially L-shaped draw bar pivotally mounted on the trailer and connected to said coupling means; a pair of cross bars loosely secured to the side frames of the trailer vehicle chassis and providing the connection of the draw bar thereto so as to permit horizontal pivotal movement and vertical movement of the draw bar; one arm of the L-shaped draw bar extending downwardly; and a steering bar connected to the lower end of said downwardly extending arm and to the steering mechanism of the trailer.

2. In combination with a towing vehicle and a four-wheeled trailer, a coupling member including a pair of spaced arms bolted to the rear cross member of the chassis frame of the towing vehicle; coupling means at the rear ends of said arms; a substantially L-shaped draw bar pivotally secured to the forward end of the trailer; transverse bars extending across the forward end of the chassis frame of the trailer, said draw bar being pivoted between said transverse bars and having one arm extending downwardly below the chassis frame of the trailer, the connection between said draw bar and said transverse bars permitting said draw bar to swing or rock vertically; and an adjustable steering bar having ball and socket connections to the lower end of said downwardly extending arm and to the steering mechanism of the trailer.

In testimony, that I claim the foregoing as my own, I have hereto affixed my signature.

ARVILLE RAY DAVIS.